United States Patent [19]

Schneider

[11] 4,361,434
[45] Nov. 30, 1982

[54] COOLING ARRANGEMENT FOR GLASS WARE FORMING TOOLS

[75] Inventor: Wilhelm Schneider, Auetal, Fed. Rep. of Germany

[73] Assignee: Hermann Heye, Obernkirchen, Fed. Rep. of Germany

[21] Appl. No.: 304,976

[22] Filed: Sep. 23, 1981

[30] Foreign Application Priority Data

Oct. 25, 1980 [DE] Fed. Rep. of Germany ....... 3040311

[51] Int. Cl.³ .............................................. C03B 9/38
[52] U.S. Cl. ....................................... 65/265; 65/267; 65/319; 65/355
[58] Field of Search ................. 65/265, 267, 319, 355, 65/356

[56] References Cited

U.S. PATENT DOCUMENTS

| | | | |
|---|---|---|---|
| 2,405,475 | 6/1946 | Waterbury et al. | 65/355 |
| 3,094,404 | 6/1963 | Lauck | 65/356 X |
| 3,249,418 | 5/1966 | Irwin et al. | 65/356 |
| 3,499,746 | 3/1970 | Blankenship et al. | 65/356 X |
| 3,586,491 | 6/1971 | Mennitt | 65/265 |
| 3,653,870 | 4/1972 | Foster et al. | 65/265 X |
| 3,849,101 | 11/1974 | Wythe et al. | 65/265 X |
| 4,070,174 | 1/1978 | Nebelung et al. | 65/356 X |
| 4,124,884 | 3/1979 | Jones, Jr. | 65/256 X |

*Primary Examiner*—Arthur D. Kellogg
*Attorney, Agent, or Firm*—Michael J. Striker

[57] ABSTRACT

A cooling arrangement for use in a machine for treating a thermoplastic material, especially molten glass, for cooling a split forming tool, parts of which are mounted on the machine for pivoting about a first pivoting axle, by a pressurized cooling fluid, especially air, includes at least one supply conduit stationarily mounted on the machine and operative for supplying the cooling fluid, and at least one articulated connecting conduit extending between the supply conduit and a respective fluid distributing means mounted for joint pivoting with the forming tool parts about the first pivoting axle, each articulated connecting conduit having at least two components one of which is pivotally mounted on a second pivoting axle arranged at the supply conduit, and the other of which is connected to the one component by a third pivoting axle for relative pivoting and is pivotally mounted on the fluid distributing means for pivoting relative thereto by a fourth pivoting axle, the first, second, third and fourth pivoting axles being parallel to one another. Sealing gap forming seals may be used for sealing the articulated conduit components, the supply conduit, and the fluid distributing means with respect to one another when the cooling fluid is a low-pressure gaseous fluid.

14 Claims, 20 Drawing Figures

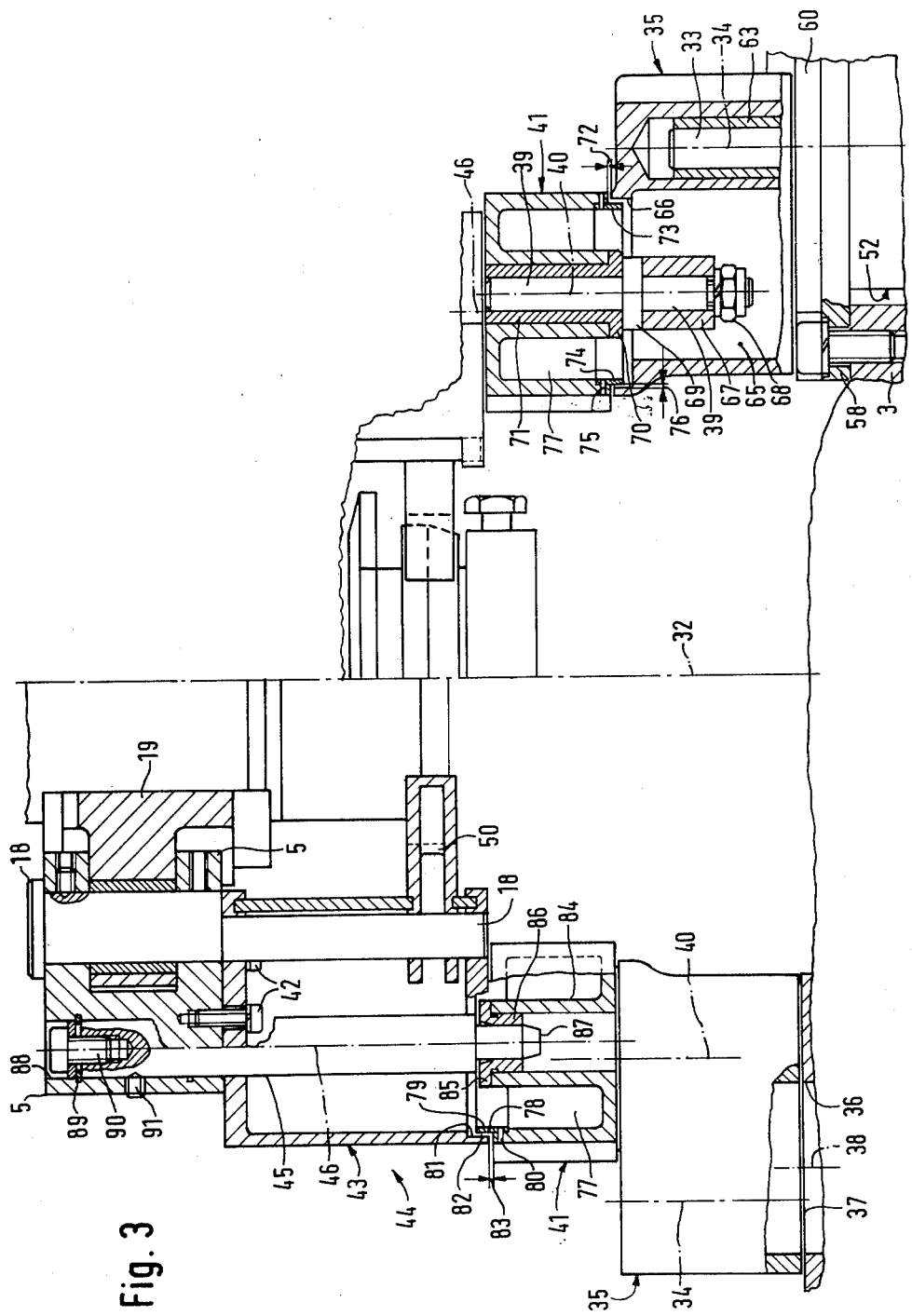

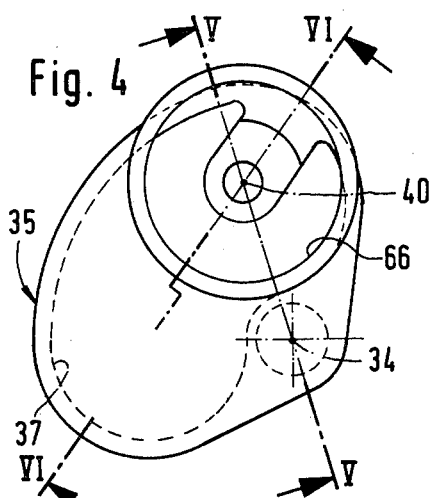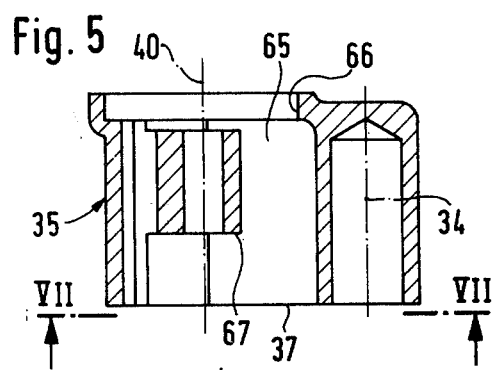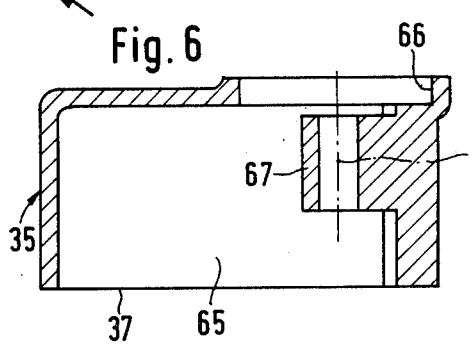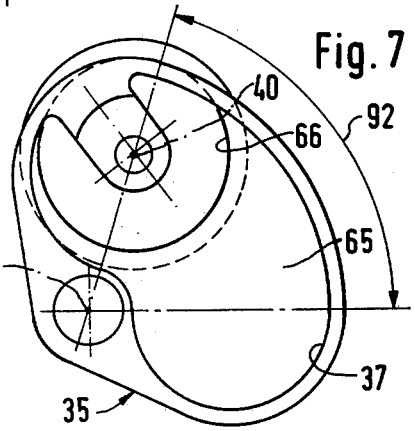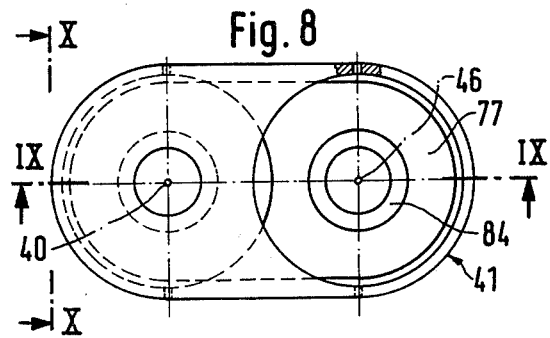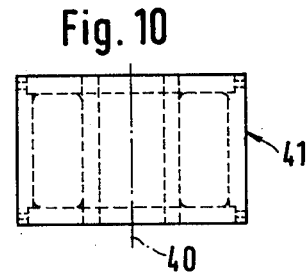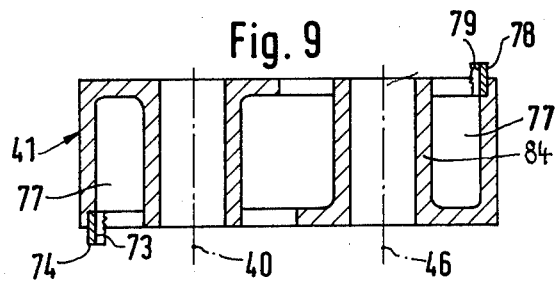

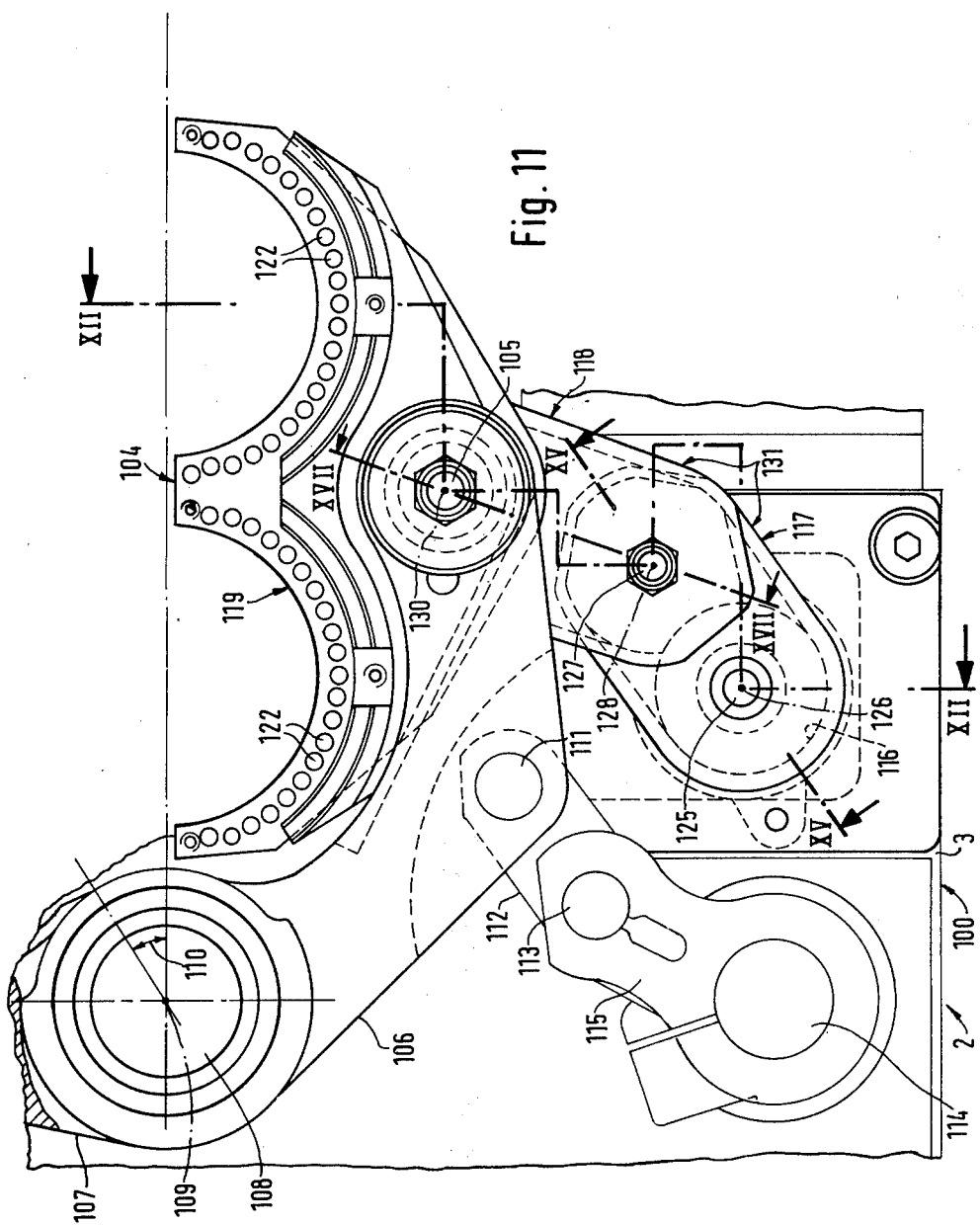

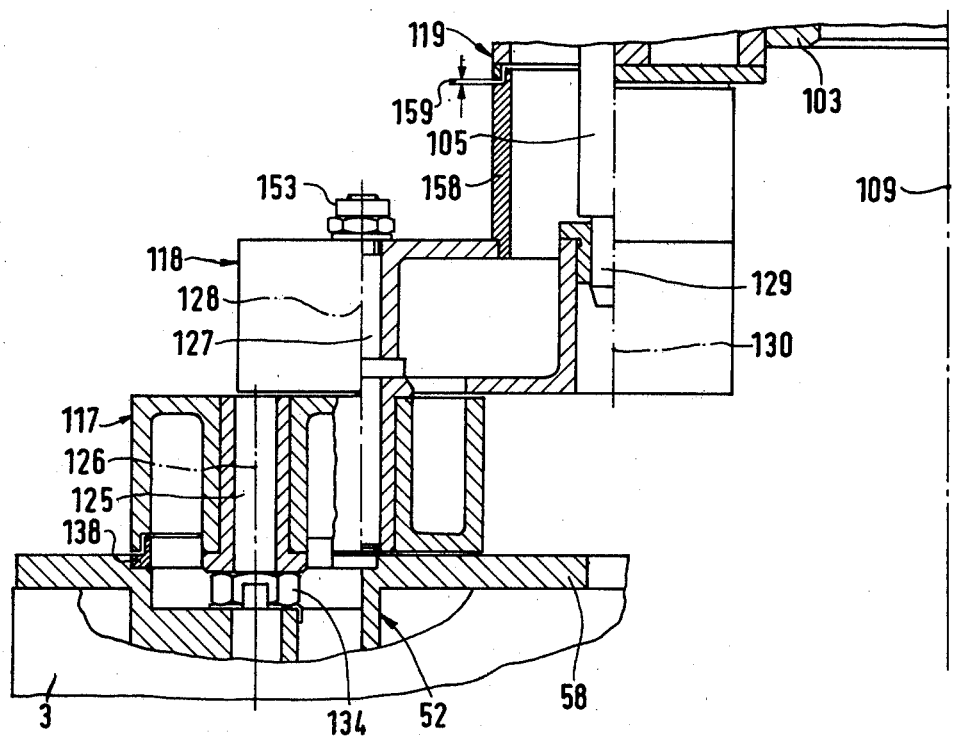

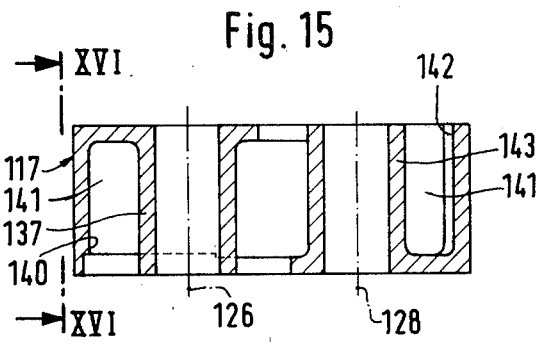
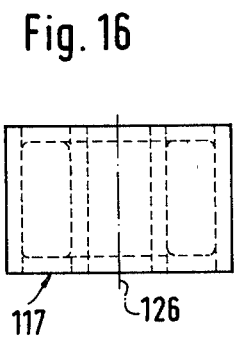
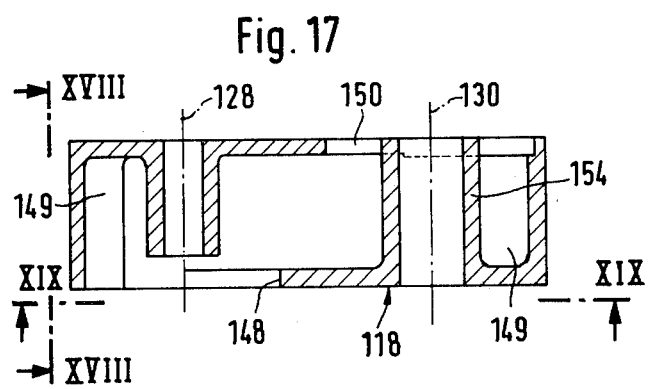
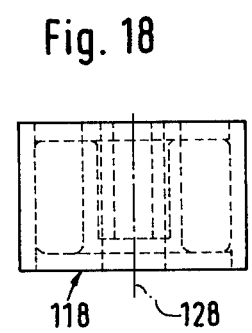
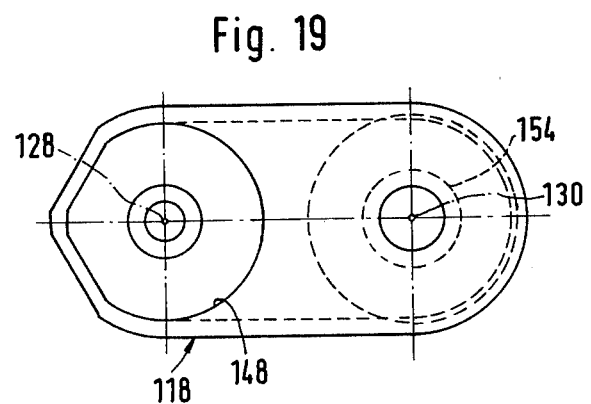

COOLING ARRANGEMENT FOR GLASS WARE FORMING TOOLS

BACKGROUND OF THE INVENTION

The present invention relates to cooling arrangements in general, and more particularly to a cooling arrangement for use in a machine for treating a thermoplastic material, especially molten glass, for cooling a forming tool by a pressurized cooling fluid, especially air.

There are already known cooling arrangements of this type for use in molding or similarly shaping machines. In such machines, forming tools are being used which are mounted on the machine frame for pivoting between their open and closed positions. The cooling fluid for cooling such forming tools or mold is supplied through a supply conduit which is stationary with respect to the machine frame and has to be transferred to the pivotably mounted forming tool or mold irrespective of the position of the latter relative to the machine frame.

One cooling arrangement which is capable of accomplishing this task of transferring the fluid from the stationary supply conduit to the movable tool or mold is known from the Sales Bulletin No. 7 of the Emhart Zürich S.A. company of Zürich, Switzerland, entitled "Mould Holders with Internal Cooling" 191-6950. In the machine disclosed in this publication, there is provided a connecting conduit between the supply conduit and the mold to be cooled, the connecting conduit being constructed as a telescopic tube structure, the two free ends of which are connected to a part of a hollow spherical element which is open at both ends, respectively. Each of the hollow spherical elements is received in a socket having a partly spherical recess, the sockets being secured to the supply conduit and to the fluid distributing box, respectively. An important disadvantage of this construction is the relatively small range of angular displacement of the fluid distributing box and thus of the forming tool, which is predetermined by the use of the spherical joints. A result of this limitation of the angular displacement range is that the overall axial length of the mold must not be less than a predetermined value. Furthermore, when the forming tools have a relatively small axial length, the fluid can, in the final analysis, be introduced only at the axial end portion of the respective forming tool, at such a large distance between the supply conduit and the fluid distributing box as possible.

SUMMARY OF THE INVENTION

Accordingly, it is a general object of the present invention to avoid the disadvantages of the prior art.

More particularly, it is an object of the invention to provide a cooling arrangement for use especially in molding machines which is not possessed of the disadvantages of the conventional arrangements of this type.

Still another object of the present invention is to develop a cooling arrangement of the type here under consideration in which it is possible to increase the range of angular displacement of the forming tool or mold regardless of the axial length of the forming tool or mold.

It is yet another object of the invention to so construct the cooling arrangement as to render it possible to feed the cooling fluid into the fluid distributing device in any arbitrarily selected plane of the forming tool.

A concomitant object of the present invention is to so design the cooling arrangement as to be simple in construction, inexpensive to manufacture, easy to use, and reliable in operation nevertheless.

In pursuance of these objects and others which will become apparent hereafter, one feature of the present invention resides in a cooling arrangement for use in a machine for treating a thermoplastic material, especially molten glass, for cooling a split forming tool, parts of which are mounted on the machine for pivoting about a first pivoting axle, by a pressurized cooling fluid, especially air, the cooling arrangement, briefly stated, comprising at least one supply conduit stationarily mounted on the machine for supplying the cooling fluid, a fluid distributing means mounted for joint pivoting with the forming tool parts about the first pivoting axle; and at least one articulated connecting conduit each including at least two components which are respectively pivotable relative to the supply conduit and to the fluid distributing means and which are pivotable relative to one another. The articulated conduit components can be given any arbitrary length and configurations in the pivoting direction. Furthermore, the pivoting paths of the articulated conduit components can be advantageously selected in accordance with the space availability in the machine.

The forming tool can be of the single or multiple gob type. The supply conduit can be made stationary relative to the machine by being mounted on the latter, or by being connected to a distributing pipe forming a part of a distribution system installed in the building in which the machine is situated. The first pivoting axle, about which the individual parts of the forming tool pivot, is advantageously constructed as a hinge column on which there are mounted for pivoting forming tong arms which carry the forming tool parts.

Particularly advantageous conditions of movement of the articulated conduit components are obtained when only a first and a second of such components are provided, and when mounting means is provided for mounting the first and second components, such mounting means including a second pivoting axle parallel to the first pivoting axle and stationarily mounted on the machine at the supply conduit for pivotably mounting the first component thereat, a third pivoting axle parallel to the first and second pivoting axles and interposed between the components or pivotably connecting the same to one another, and a fourth pivoting axle parallel to the first, second and third pivoting axles and stationary relative to the fluid distributing means for pivotably mounting the second component thereat. Other advantages of this particular construction are that the components require only a minimum amount of available space within the machine for their operation, and that the movement thereof is derived from the movement of the fourth pivoting axle, without any need for providing separate driving means for the components.

When the cooling fluid is a gaseous cooling fluid, it is especially advantageous when the components are sealed with respect to one another and with respect to the supply conduit and the fluid distributing means by sealing means which includes means for bomding respective sealing gaps between the components, the supply conduit, and the fluid distributing means. Sealing means of this character are simple and reliable in operation, and yet only small or negligible leakage losses are encountered therethrough when the gaseous fluid is blown into the cooling system at a low pressure.

It is further advantageous when an extension element is provided, the extension element being of a selected length and being interposable between the supply conduit and the adjoining component of the articulated connecting conduit. By using such an extension element, the cooling arrangement can be fitted to different forming tools at the lowest possible expense. It is especially advantageous that the articulated conduit components need not be exchanged when forming tools of one type and one size are replaced by forming tools of a different type and different size. In this manner, the period of time needed for switching from the production of one type of articles to another is considerably reduced.

The same advantages can be obtained when, in accordance with another aspect of the present invention, there is provided an extension element of a selected length which is interposable between the fluid distributing means and the adjoining component of the articulated conduit. This expedient is resorted to primarily when it is simpler, for structural or operational reasons, to make the necessary adjustment downstream rather than upstream of the articulated connecting conduit.

An easy pivoting movement which requires only a low force is obtained when the pivoting axles are so arranged and the components so dimensioned that a plane defined by the longitudinal axes of the second and third pivoting axles always encloses an angle of at least 0° and less than 180° with a plane defined by the longitudinal axes of the third and fourth pivoting axles.

Especially advantageous conditions of movement are obtained when the pivoting axles are so arranged and the components so dimensioned that the longitudinal axis of the second pivoting axle and/or the longitudinal axis of the third pivoting axle is always situated outwardly of the trajectory of movement of the longitudinal axis of the fourth pivoting axle, as seen from the first pivoting axle.

In special space-availability or operational conditions in the machine, the same advantages as obtained by using the expedients discussed just above are achieved when the pivoting axles are so arranged and the components are so dimensioned that the longitudinal axis of the third pivoting axle and/or the longitudinal axis of the second pivoting axle are always arranged inwardly of the trajectory of movement of the longitudinal axis of the fourth pivoting axle as seen from the first pivoting axle.

The first component has an inlet opening permanently communicating with the supply conduit, and an outlet opening concentric with the third pivoting axle and communicating with the inlet opening. When the second pivoting axle is arranged parallel to, that is, at a distance from, the longitudinal axis of the supply conduit, there is obtained a particularly simple and space-saving construction of the first component when the inlet opening thereof extends along a partly annular course about the second pivoting axle. When no such distance exists, then it is advantageous when the inlet opening of the first component is concentric with the second pivoting axle.

A simple, easy-to-manufacture, and space-saving construction of the second component is obtained when the latter is provided with an inlet opening coaxial with the outlet opening of the first component, and an outlet opening which is concentric with the fourth pivoting axle, is coaxial with and communicates with an inlet opening of the fluid distributing means, and is in communication with the inlet opening of the second component.

The novel features which are considered as characteristic of the invention are set forth in particular in the appended claims. The improved cooling arrangement itself, however, both as to its construction and its mode of operation when embodied in a press- and blow-molding machine for manufacturing glass articles, together with additional features and advantages thereof, will be best understood upon perusal of the following detailed description of certain specific embodiments with reference to the accompanying drawing.

BRIEF DESCRIPTION OF THE DRAWING

FIG. 3 is a sectional view taken along the line III—III of FIG. 1

FIG. 4 is a top plan view of a first articulated conduit component of the cooling arrangement of FIGS. 1 to 3;

FIG. 5 is a sectional view taken along the line V—V of FIG. 4;

FIG. 6 is a sectional view taken along the line VI—VI of FIG. 4;

FIG. 7 is a bottom plan view taken along the line VII—VII of FIG. 5;

FIG. 8 is a top plan view of a second articulated conduit component of the cooling arrangement of FIGS. 1 to 3;

FIG. 9 is a sectional view taken along the line IX—IX of FIG. 8;

FIG. 10 is an end view taken along the line X—X of FIG. 8;

FIG. 11 is a top plan view, partially in section, of another part of the glass-forming machine;

FIG. 14 is a view corresponding to that of FIG. 12 but showing another modification;

FIG. 15 is a sectional view taken along the line XV—XV of FIG. 11 through a first articulated conduit component of a cooling arrangement situated at this location;

FIG. 16 is an end view taken along the line XVI—XVI of FIG. 15;

FIG. 17 is a sectional view taken along the line XVII—XVII of FIG. 11 through the second articulated conduit component;

FIG. 18 is an end view taken along the line XVIII—XVIII of FIG. 17;

FIG. 19 is a bottom view taken along the line XIX—XIX of FIG. 17; and

DETAILED DESCRIPTION OF THE PREFERRED EMBODIMENTS

Figure 1:
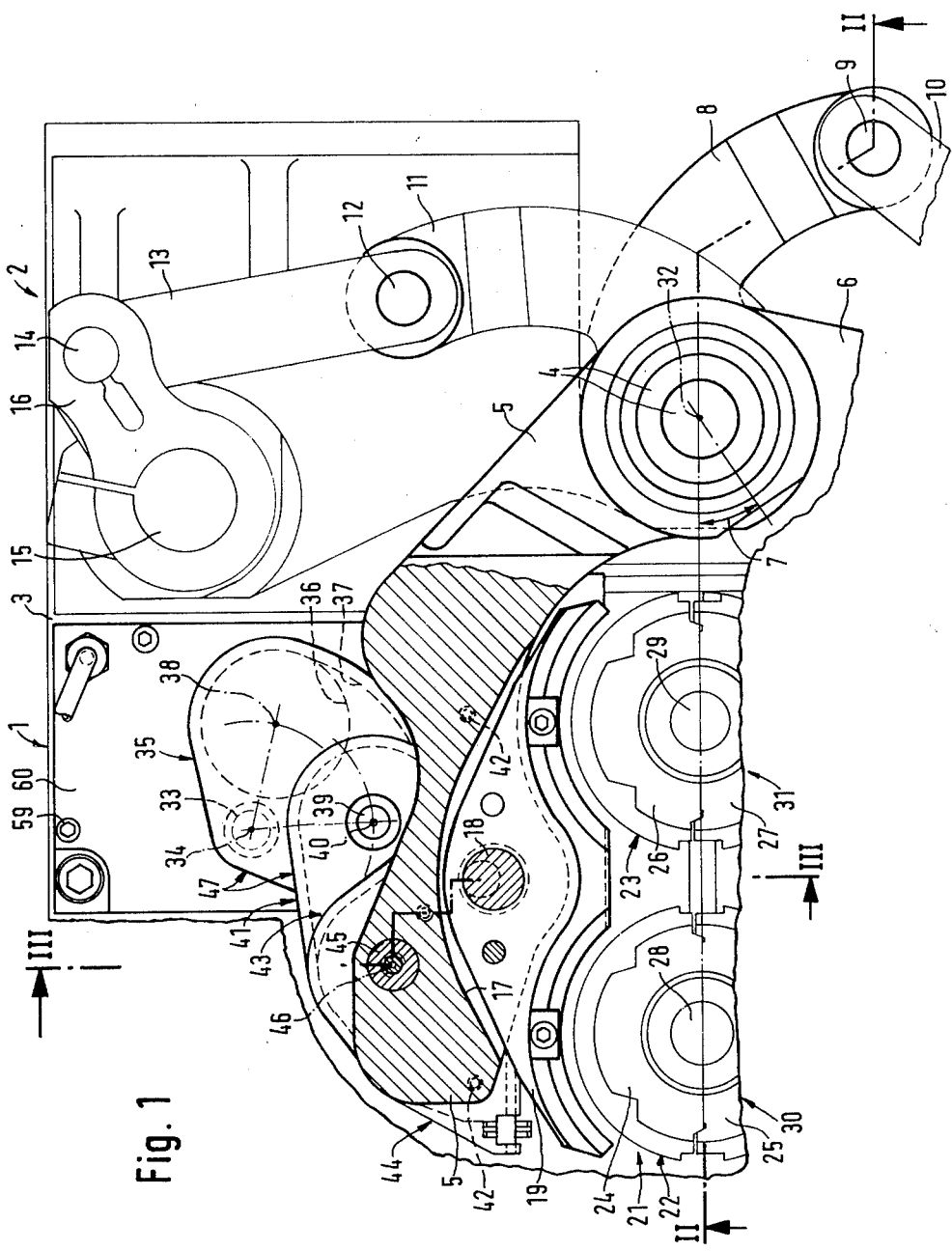
FIG. 1 is a partially sectioned top plan view of a part of a glass-forming machine with a cooling arrangement in accordance with the present invention.

Referring now to the drawing in detail, and first to FIG. 1 thereof, it may be seen that the reference numeral 1 has been used to indentify the pre-forming part of a station 2 of a so-called I.S. glass forming machine. The basic construction and mode of operation of such a machine and of the station 2 thereof are well known so that they will be discussed herein only to the extent necessary to understand the present invention. In the station 2, gobs of molten or viscous glass, which are supplied from a non-illustrated glass gob feeding device of a conventional construction, are shaped into hollow glass articles in a pressing and blowing operation.

An upright hinge column 4 is rigidly connected with a frame 3 of the station 2, and pre-forming tong halves 5 and 6 are pivotally mounted thereon. In FIG. 1, the pre-forming tong half 5 is shown in its closed position and the pre-forming tong half 6 is shown in its fully open position in which it is displaced by an angle 7 from its closed position. A rearward arm 8 is connected to the pre-forming tong half 5, and it is articulated by a bolt 9 to a lug 10. In a similar manner, a rearward arm 11 extends from the pre-forming tong half 6 and is coupled by a bolt 12 to a lug 13 which is articulated to a crank pin 14 of a crank 16 which is secured to a driving shaft 15. The lug 10 can be mounted and operated in a similar manner.

A tilting member 19 is mounted on a tilting bolt 18 in a lateral recess 17 of the pre-forming tong half 5. Two preforming mold halves which are not illustrated in FIG. 1 but one of which may be seen at 20 in FIG. 2 and which together constitute a pre-forming tool 21 which is constructed as a double mold can be mounted on the tilting member 19. The pre-forming tool 21 additionally includes two split neck-forming molds 22 and 23 which are mounted in a conventional manner in the station 2 for movement independently of the pre-forming tong halves 5 and 6. The neck-forming mold 22 includes two neck ring halves 24 and 25, whereas the neck-forming mold 23 includes two neck ring halves 26 and 27.

The pre-forming tong half 6 is constructed and equipped in the same manner as the pre-forming tong half 5 and carries pre-forming tool halves which have been omitted from the drawing in order not to unnecessarily encumber the same and which are complementary to the pre-forming mold halves 20. In the closed positions of the pre-forming tong halves 5 and 6, the lower regions of the pre-forming mold halves, such as 20, overlap the upper regions of the closed neck ring halves 22 and 23.

Pressing plungers 28 and 29 penetrate centrally from below through the neck-forming molds 22 and 23 into the interior of the closed pre-forming mold halves, such as 20, and respectively serve for preshaping a gob of glass which has previously been introduced into the interior of a respective parison mold 30 or 31 into a parison.

The hinge column 4 constitutes a first pivoting axle having a longitudinal axis 32. A first articulated conduit component 35 is mounted for pivoting about a second pivoting axle 33 which has a longitudinal axis 34 and which is so stationarily connected to the frame 3 as to extend parallel to the first pivoting axle 4. The first articulated conduit component 35 includes an inlet opening 37 which extends along a part of an annular course around the second pivoting axle 33 and which is in permanent communication with a supply conduit 36 which is stationary relative to the frame 3, for conducting a stream of a fluid, such as of pressurized air, toward the pre-forming tool 21 for cooling the same. The supply conduit 36 has a longitudinal axis 38 which extends parallel to the longitudinal axis 34.

A third pivoting axle 39 having a longitudinal axis 40 is mounted on the first articulated conduit component 35 in a manner which is illustrated in detail in FIG. 3, so that the longitudinal axis 40 extends parallel to the longitudinal axis 34.

A second articulated conduit component 41 is mounted on the third pivoting axle 39. The second articulated conduit component 41 receives the fluid from the first articulated conduit component 35 and conducts the same further to a fluid distributing box 43 of a fluid distributing arrangement 44, the fluid distributing box 43 being connected to the pre-forming tong half 5 by respective screws 42.

The second articulated conduit component 41 is also pivotable about a fourth pivoting axle 45 which has a longitudinal axis 46 that is parallel to the longitudinal axis 40. As may best be seen in FIG. 3, the fourth pivoting axle 45 is connected to the pre-forming tong half 5 and, therefore, that end of the second articulated conduit component 41 which is mounted on the fourth pivoting axle 45 is caused to move along a circle centered on the longitudinal axis 32 during the opening and closing movements of the pre-forming tong half 5.

The first articulated conduit component 35 and the second articulated conduit component 41 together constitute an articulated connecting conduit 47 extending between the supply conduit 36 and the fluid distributing arrangement 44.

The pre-forming tong half 6 is supplied with fluid in the same manner as the pre-forming tong half 5.

The same parts are identified in the drawings by the same reference numerals in each instance.

Figure 2:
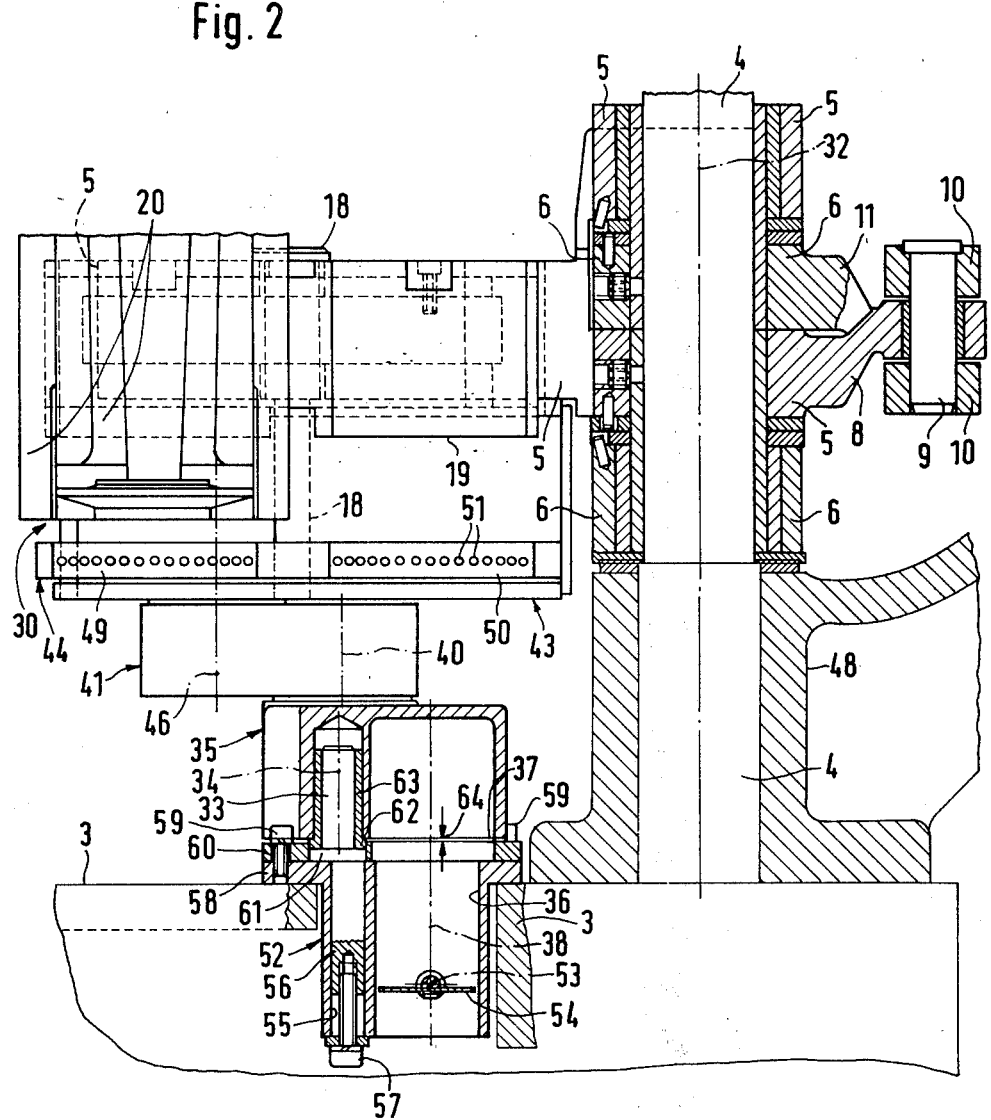
FIG. 2 is a sectional view taken along the line II—II of FIG. 1.

As illustrated in FIG. 2, the hinge column 4 which constitutes the first pivoting axle 4 is held in position underneath a holder 48 which is affixed to the frame 3, for instance, by screws. In the pre-forming tong half 5, there is shown the hung-in pre-forming mold half 20 at the left, but not at the right in order to be able to show details of the tilting member 19 and of the pre-forming tong half 5. The neck-forming molds 22 and 23 are not shown in FIG. 2. Cooling fluid is directed against such neck-forming molds 22 and 23 in the radial direction, however, in that the cooling fluid is permitted to freely escape from apertures 51 of jet segments 49 and 50. The number, sizes and distribution of the jet apertures 51 of the jet segments 49 and 50 are so selected as to achieve optimum cooling of the neck-forming molds 22 and 23.

The jet segments 49 and 50 constitute fluid outlet members of the fluid distributing box 43.

An insert 52 which forms the supply conduit 36 is inserted for each of the pre-forming tong halves 5 and 6 in the machine frame 3. A valve plate 54 is mounted in the supply conduit 36 for tilting about an axle 53. A bore 55 of the insert 52 receives a lower extension 56 of the second tilting axle 33, which is held in position in the bore 55 by a screw 57.

An intermediate plate 60 is connected, such as by a threaded connection, to an upper flange 58 of the insert 52. As shown, the threaded connection is constituted by screws 59. The intermediate plate 60 has a bore that accommodates a collar 61 of the second pivoting axle 33 as well as a flange 62 of a sleeve 63 which serves as a bearing for the second pivoting axle 33.

The flange 62 extends in the upward direction as considered in FIG. 2 of the drawing beyond the top surface of the intermediate plate 60 and supports the first articulated conduit component 35 in such a manner that a relatively small gap is obtained between the upper surface of the intermediate plate 60 and the lower surface of the first articulated conduit component 35. Any loss of fluid through the gap 64 is negligibly small, especially when the blowing pressure of the fluid is relatively low, as it often is in machines of this type.

As may be seen in FIG. 3, the inlet opening 37 of the first articulated conduit component 35 is in permanent communication via an internal space 65 with an outlet opening 66 of the first articulated conduit component 35, the outlet opening 66 being centered on the longitudinal axis 40 of the third pivoting axle 39. A lower end of the third pivoting axle 39 passes through a bore of a web 67 of the first articulated conduit component 35 and is held in position therein by a self-locking nut 68. Furthermore, a collar 69 of the third pivoting axle 39 rests on the upper surface of the web 67. An upper surface of the collar 69 carries a flange 70 of a sleeve 71 which serves as a bearing for an upper part of the third pivoting axle 39.

The second articulated conduit component 41 is supported on an upper surface of the flange 70 in such a manner that a relatively narrow gap 72 exists between an upper surface of the first articulated conduit component 35 and a lower surface of the second articulated conduit component 41. A tubular element 74 is introduced into the lower part of the second articulated conduit component 41 and is held in position by pins 75. The tubular element 74 bounds an inlet opening 73 of the second articulated conduit 41 and is coaxial with the third pivoting axle 39. The tubular element 74 extends in the downward direction into the outlet opening 66 and forms in the same a circumferentially complete, relatively narrow gap 76.

The inlet opening 73 is in constant communication, via an internal space 77, with an outlet opening 79 which is bounded by a tubular element 78 and which is coaxial with the fourth pivoting axle 45. The tubular element 78 is secured in position relative to the second articulated conduit component 41 by pins 80 and extends into an inlet opening 81 of the fluid distributing box 43, which is concentric with the fourth pivoting axle 45, in such a manner that the tubular element 78 delimits a relatively thin annular gap 82 in the inlet opening 81. A small gap 83 exists also between an upper surface of the second articulated conduit component 41 and a lower surface of the fluid distributing box 43.

A cylindrical apertured web 84 of the second articulated component 41 carries at its upper surface a flange 85 of a sleeve 86 into which there extends a driving extension 87 of the fourth pivoting axle 45.

The fourth pivoting axle 45 passes through the interior of the fluid distributing box 43 and extends into a bore 88 of the pre-forming tong half 5 or 6. The fourth pivoting axle 45 is axially secured in its position within the bore 88 by a split ring 89 and a screw 90, and is secured in the circumferential direction by a grub screw 91.

FIGS. 4 to 7 illustrate further details of the first articulated conduit component 35. FIG. 7 also shows a maximum pivoting angle 92 of the first articulated conduit component 35 about the longitudinal axis 34.

Further details of the second articulated conduit component 41 are illustrated in FIGS. 8 to 10.

FIG. 11 depicts a portion of a finish forming part 100 of the station 2. The parisons which have been shaped in the pre-forming part of FIG. 1 are blown in the finish forming part 100 into the finished hollow glass articles, in a manner which is per se known. This takes place in a finishing forming tool 101 which is shown in detail in FIGS. 12, 13 and 20 and which, because of the chosen double gob operation, has two finishing molds 102. Each of the finishing molds 102 is equipped with two finishing mold halves 103 which can have different axial lengths in dependence on the dimensions of the final hollow glass article to be produced.

Each finishing mold half 103 can be suspended from a tilting member 104 which is tiltably mounted on a tilting bolt 105 of a finishing mold tong half 106 and 107. On their parts, the finishing mold tong halves 106 and 107 are pivotally mounted on a hinge column which is secured to the machine frame 3 and constitutes a first pivoting axle 108 having a longitudinal axis 109. In FIG. 11, the finishing mold tong half 106 is shown in its closed position, while the finishing mold tong half 107 is shown in its fully open position in which it is displaced by an angle 110 from its closed position.

Each finishing mold tong half 106 and 107 is connected by means of a bolt 111 with a lug 112 which is mounted on a crank pin 113 of a crank 115 connected to a driving shaft 114, for angular displacement relative to the crank pin 113.

Cooling fluid for cooling the finishing forming tool 101 flows from a supply conduit 116 which is stationarily mounted on the machine frame 3 into a first articulated conduit component 117, from there into a second articulated conduit component 118, and from there into a fluid distributing box 119 which is secured by screws 120 to a collar 121 of the tilting bolt 105. The cooling fluid escapes from the interior of the fluid distributing box 119 through a plurality of apertures 122 and enters bores 123 in the associated finishing mold halves 103 which are in registry therewith. Finally, the cooling fluid leaves the bores 123 at the upper end of the respective finishing mold half 103 in the direction of an arrow 124.

The first articulated conduit component 117 is mounted for pivoting about a second pivoting axle 125 which is stationary with respect to the machine frame 3 and parallel to the first pivoting axle 108 and which has a longitudinal axis 126. The second articulated conduit component 118 is mounted for pivoting on a third pivoting axle 127 which is parallel to the second pivoting axle 125, is mounted on the first articulated conduit component 117, and has a longitudinal axis 128. In addition thereto, the second articulated conduit component 118 is pivotally mounted on a fourth pivoting axle 129 having a longitudinal axis 130 and shown in particular in FIG. 12. The fourth pivoting axle 129 is parallel to the third pivoting axle 127 and forms a lower extension of the tilting bolt 105 so that the longitudinal axis 130 thereof coincides with that of the tilting bolt 105.

The first articulated conduit component 117 and the second articulated conduit component 118 together constitute an articulated connecting conduit 131 for supplying the cooling fluid.

Figure 12:
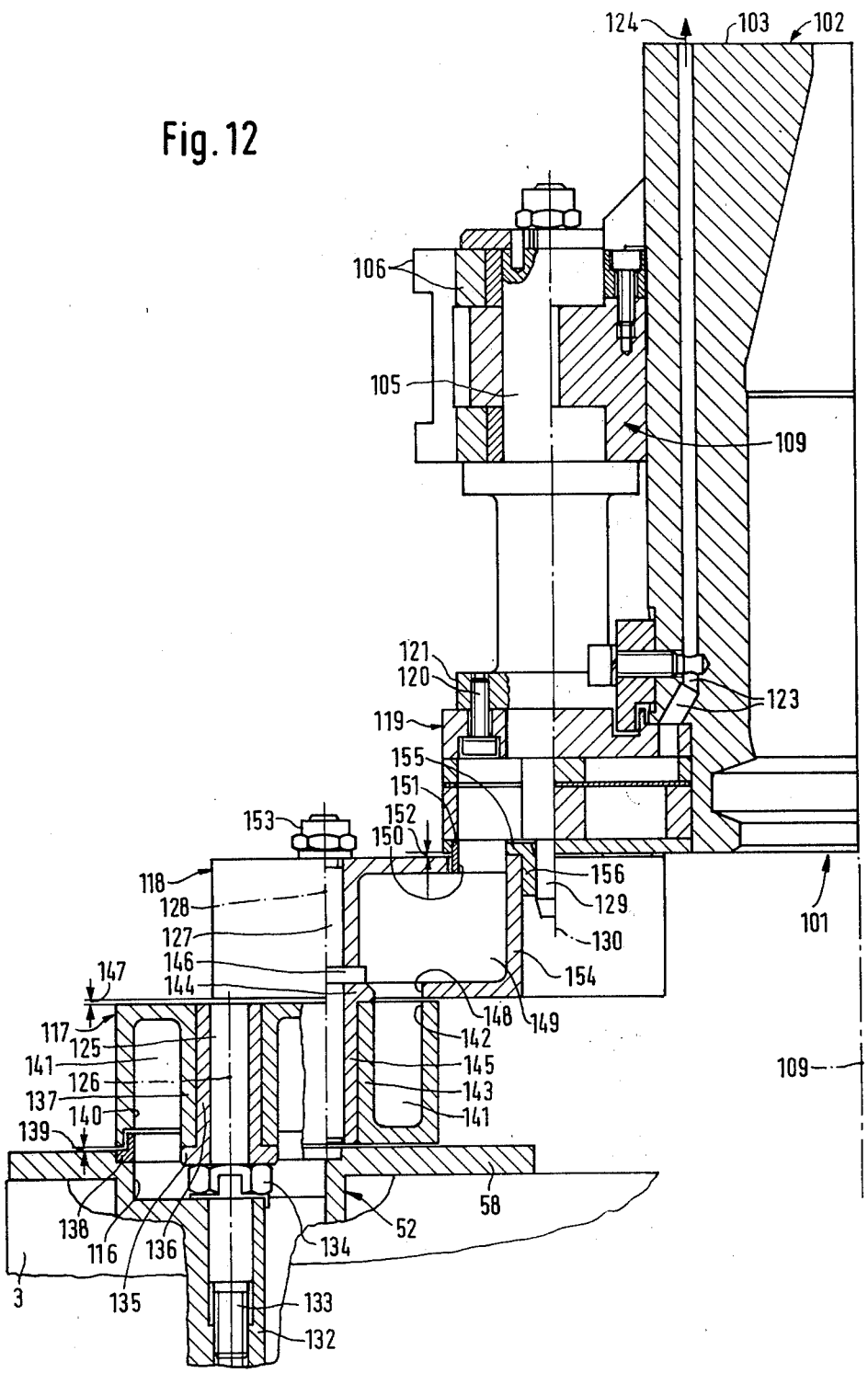
FIG. 12 is a sectional view taken along the line XII—XII of FIG. 11.

As may be seen especially in FIG. 12, a threaded extension 133 of the second pivoting axle 125 is secured in a web 132 of the insert 52 by means of an integrated nut 134. A flange 135 of a bearing sleeve 136 which supports the second pivoting axle 125 rests on the nut 134. A hollow cylindrical web 137 of the first articulated conduit component 117 is so supported on an upper surface of the flange 135 that a relatively narrow gap 139 is formed between a stepped ring 138 accommodated in the flange 58 and an annular inlet opening 140 of the first articulated conduit component 117. The inlet opening 140 is coaxial with the second pivoting axle 125 and is in permanent communication via an inner space 141 with an outlet opening 142 of the first articulated conduit component 117 which also has an annular configuration. The outlet opening 142 is coaxial with the third pivoting axle 127.

A flange 144 of a bearing sleeve 145 which mounts the third pivoting axle 127 is supported on a hollow cylindrical web 143 of the first articulated conduit component 117. A collar 146 of the third pivoting axle 127 is so supported on an upper surface of the flange 144 that a small gap 147 is present between an upper surface of the first articulated conduit component 117 and a lower surface of the second articulated conduit component 118.

A circularly annular inlet opening 148 of the second articulated conduit component 118 is aligned with the outlet opening 142. The inlet opening 148 is in constant communication with an annular outlet opening 150 of the second articulated conduit component 118 via an inner space 149. The outlet opening 150 is coaxial with the fourth pivoting axle 129 and is delimited by a tubular conduit element 151 which is introduced from below into the fluid distributing box 119. A relatively small gap 152 is present between the the fluid distributing box 119 and the tubular element 151, on the one hand, and an edge portion of the second articulated conduit component 118 which surrounds the outlet opening 150, on the other hand. The second articulated conduit component 118 is held in abutment with the collar 146 by a self-locking nut 153 which is threaded onto a threaded end portion of the third pivoting axle 127. A flange 155 of a sleeve 156 which is supported on the fourth pivoting axle 129 rests on an upper surface of a hollow-cylindrical web 154 of the second articulated conduit component 118.

According to FIG. 12, finishing mold halves 103 of an intermediate axial length are being used.

Figure 13:
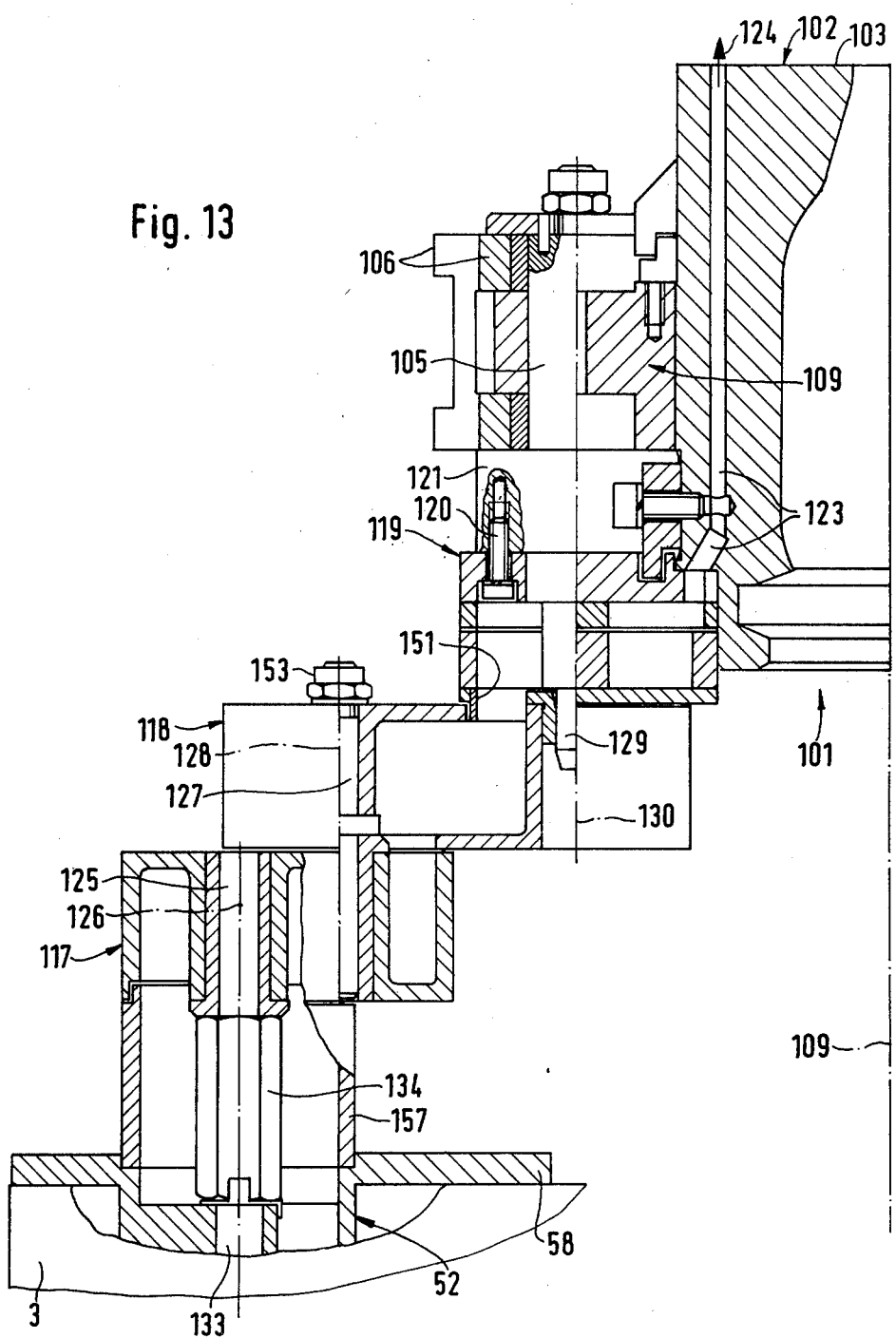
FIG. 13 is a view corresponding to that of FIG. 12 but showing a modification.

In contradistinction thereto, however, finishing mold halves 103 of a smaller axial length are being used in FIG. 13. Inasmuch as the insert 52 equipped with the flange 58 should preferably not change its elevation during this change of molds, the stepped ring 138 of FIG. 12 is removed from its socket in the flange 58 and it is replaced by a tubular extension element 157. In addition thereto, as also shown in FIG. 13, a second pivoting axle 125, axially extended at the nut 134, is mounted so that the system including the parts 117, 118 and 119 is lifted to the new elevation for connection to the shorter final mold halves 103.

In FIG. 14, the same finishing mold halves 103 as those shown in FIG. 13 are being used. However, since the first articulated conduit component 117 and the second articulated component 118 are supposed to keep their positions as assumed in FIG. 12 in this instance, the intermediate space between the second articulated conduit 118 and the fluid distributing box 119 is bridged by a tubular extension element 158, after the tubular element 151 has been removed from the fluid distributing box 119. The tubular extension element 158 is so dimensioned as to be received in the associated bore in the second articulated conduit component 118 with a slight interference fit and forms a small gap at its upper end with the fluid distributing box 119. In the alternative, the tubular extension element 158 could also be secured to the fluid distributing box 119 instead of the tubular element 151 and form a gap corresponding to the gap 152 of FIG. 12 with the second articulated conduit component 118. In FIG. 14, the tilting bolt 105 is extended in the downward direction by the effective length of the tubular extension element 158.

Further details of the first articulated conduit component 117 are shown in FIGS. 15 and 16.

FIGS. 17 to 19 show further details of the second articulated conduit component 118.

Figure 20:
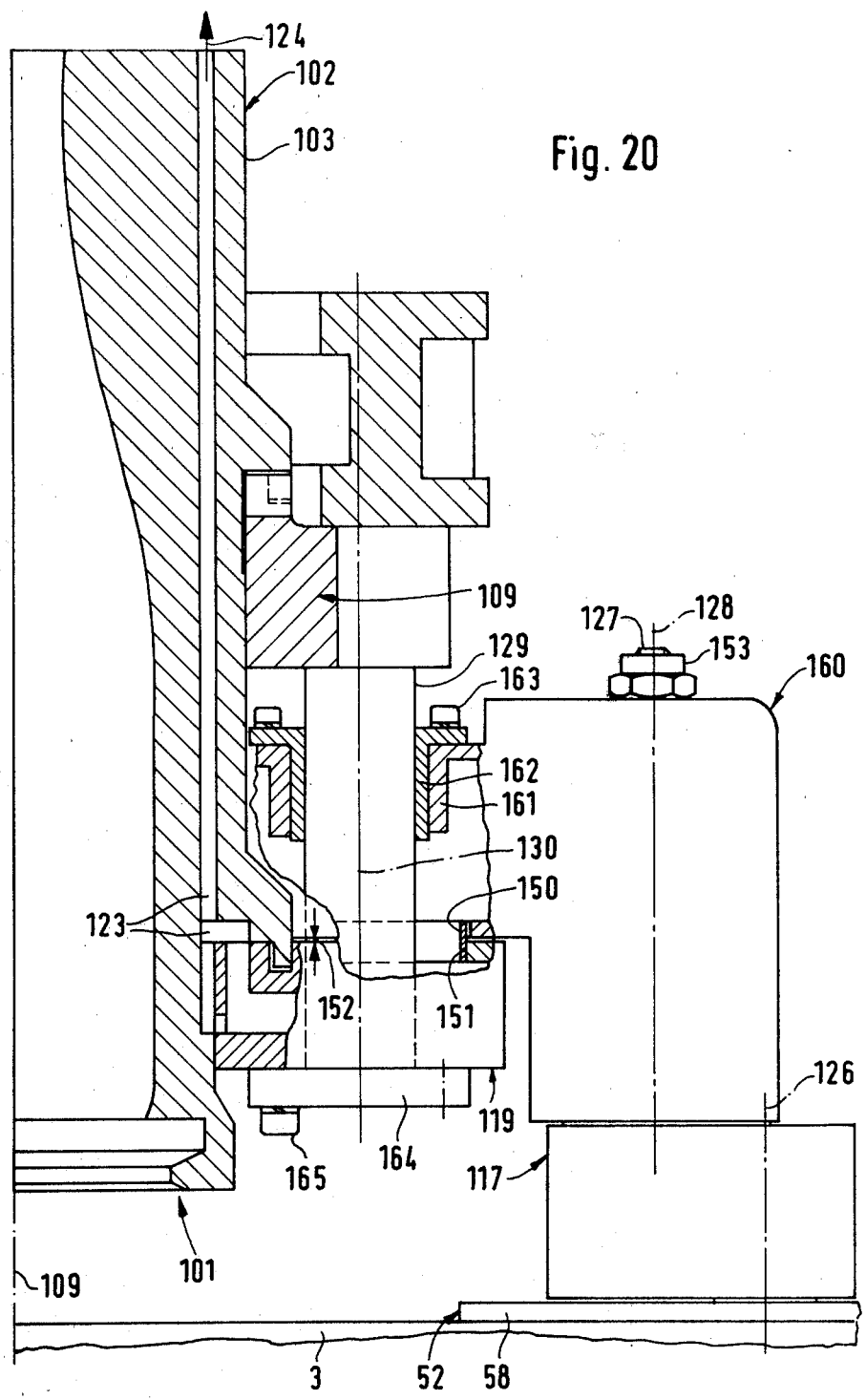
FIG. 20 is a partial longitudinal section though another embodiment of the machine and of the cooling arrangement.

FIG. 20 shows a finishing mold half 103 which has an axial length exceeding that of the finishing mold half 103 illustrated in FIG. 12. In this instance, the fluid flows from the first articulated conduit component 117 into a special, essentially L-shaped, second articulated conduit component 160 which supplies the cooling fluid into the fluid distributing box 119 from above, in contradistinction to FIG. 12. The second articulated conduit component 160 has a hollow cylindrical web 161 to which there is secured by means of screws 163 a bearing sleeve 162 supported on the fourth pivoting axle 129. The fourth pivoting axle 129 extends downwardly through the fluid distributing box 119 and is provided at its lower end portion with a flange 164. The fluid distributing box 119 is supported on an upper surface of the flange 164 and is secured to the latter by screws 165.

It will be understood that each of the elements described above, or two or more together, may also find a useful application in other types of arrangements differing from the types described above.

While the invention has been illustrated and described as embodied in a machine for press- and- blow-molding glass articles, it is not intended to be limited to this process and to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. A cooling arrangement for use in a machine for treating a thermoplastic material, especially molten glass, for cooling a split forming tool, parts of which are mounted on the machine for pivoting about a first pivoting axle, by a pressurized cooling fluid, especially air, comprising at least one supply conduit stationarily mounted on the machine for supplying the cooling fluid; at least one fluid distributing means mounted for joint pivoting with the forming tool parts about said first pivoting axle; and at least one articulated connecting conduit each including at least two components which are respectively pivotable relative to said supply conduit and to said fluid distributing means and which are pivotable relative to one another.

2. The cooling arrangement as defined in claim 1, wherein said articulated connecting conduit includes a first and a second of said components; and further comprising means for pivotably mounting said components, including a second pivoting axle parallel to the first pivoting axle and stationarily mounted on the machine at said supply conduit for pivotably mounting said first component thereat, a third pivoting axle parallel to said first and second pivoting axles and interposed between said components for pivotably connecting the same to one another, and a fourth pivoting axle parallel to said first, second and third pivoting axles and stationary relative to said fluid distributing means for pivotably mounting said second component thereat.

3. The cooling arrangement as defined in claim 1 for use with a gaseous cooling fluid, further comprising means for sealing said components with respect to one another and with respect to said supply conduit and said fluid distributing means, respectively, comprising means for bounding respective sealing gaps between said components, said supply conduit, and said fluid distributing means.

4. The cooling arrangement as defined in claim 1, and further comprising an extension element of a selected length interposable between said supply conduit and the adjoining component of said articulated connecting conduit.

5. The cooling arrangement as defined in claim 1, and further comprising an extension element of a selected length interposable between said fluid distributing means and the adjoining component of said articulated connecting conduit.

6. The cooling arrangement as defined in claim 1, wherein said articulated connecting conduit includes a first and a second of said components; further comprising means for pivotably mounting said components, including second, third and fourth pivoting axles parallel to the first pivoting axle, having respective longitudinal axes, and respectively interposed between said supply conduit and said first component, between said components, and between said second component and said fluid distributing means; and wherein said pivoting axles are so arranged and said components so dimensioned that a plane defined by the longitudinal axes of said second and third pivoting axles always encloses an angle with a plane defined by the longitudinal axes of said third and fourth pivoting axles which is at least 0° and is less than 180°.

7. The cooling arrangement as defined in claim 6, wherein said pivoting axles are so arranged and said components so dimensioned that the longitudinal axis of said third pivoting axle is always situated outwardly of the trajectory of movement of the longitudinal axis of said fourth pivoting axle as considered from the first pivoting axle.

8. The cooling arrangement as defined in claim 7, wherein said pivoting axles are so arranged and said components so dimensioned that the longitudinal axis of said second pivoting axle is also situated outwardly of the trajectory of movement of the longitudinal axis of said fourth pivoting axle.

9. The cooling arrangement as defined in claim 6, wherein said pivoting axles are so arranged and said components so dimensioned that the longitudinal axis of said third pivoting axle is always arranged inwardly of the trajectory of movement of the longitudinal axis of said fourth pivoting axle as considered from the first pivoting axle.

10. The cooling arrangement as defined in claim 9, wherein said pivoting axles are so arranged and said components so dimensioned that the longitudinal axis of said second pivoting axle is also situated inwardly of the trajectory of movement of the longitudinal axis of said fourth pivoting axle.

11. The cooling arrangement as defined in claim 1, wherein said articulated connecting conduit includes a first and a second of said components; further comprising means for pivotably mounting said components, including second, third and fourth pivoting axles parallel to the first pivoting axle and respectively interposed between said supply conduit and said first component, between said components, and between said second component and said fluid distributing means; and wherein said first component has an inlet opening permanently communicating with said supply conduit and an outlet opening concentric with said third pivoting axle and communicating with said inlet opening.

12. The cooling arrangement as defined in claim 11, wherein said inlet opening extends about a partly annular course about said second pivoting axle.

13. The cooling arrangement as defined in claim 11, wherein said inlet opening is concentric with said second pivoting axle.

14. The cooling arrangement as defined in claim 11, wherein said fluid distributing means has an inlet opening; and wherein said second component has an inlet opening which is coaxial with said outlet opening of said first component, and an outlet opening which is concentric with said fourth pivoting axle, is coaxial an communicates with said inlet opening of said fluid distributing means, and is in communication with said inlet opening of said second component.

* * * * *